Figure 3:
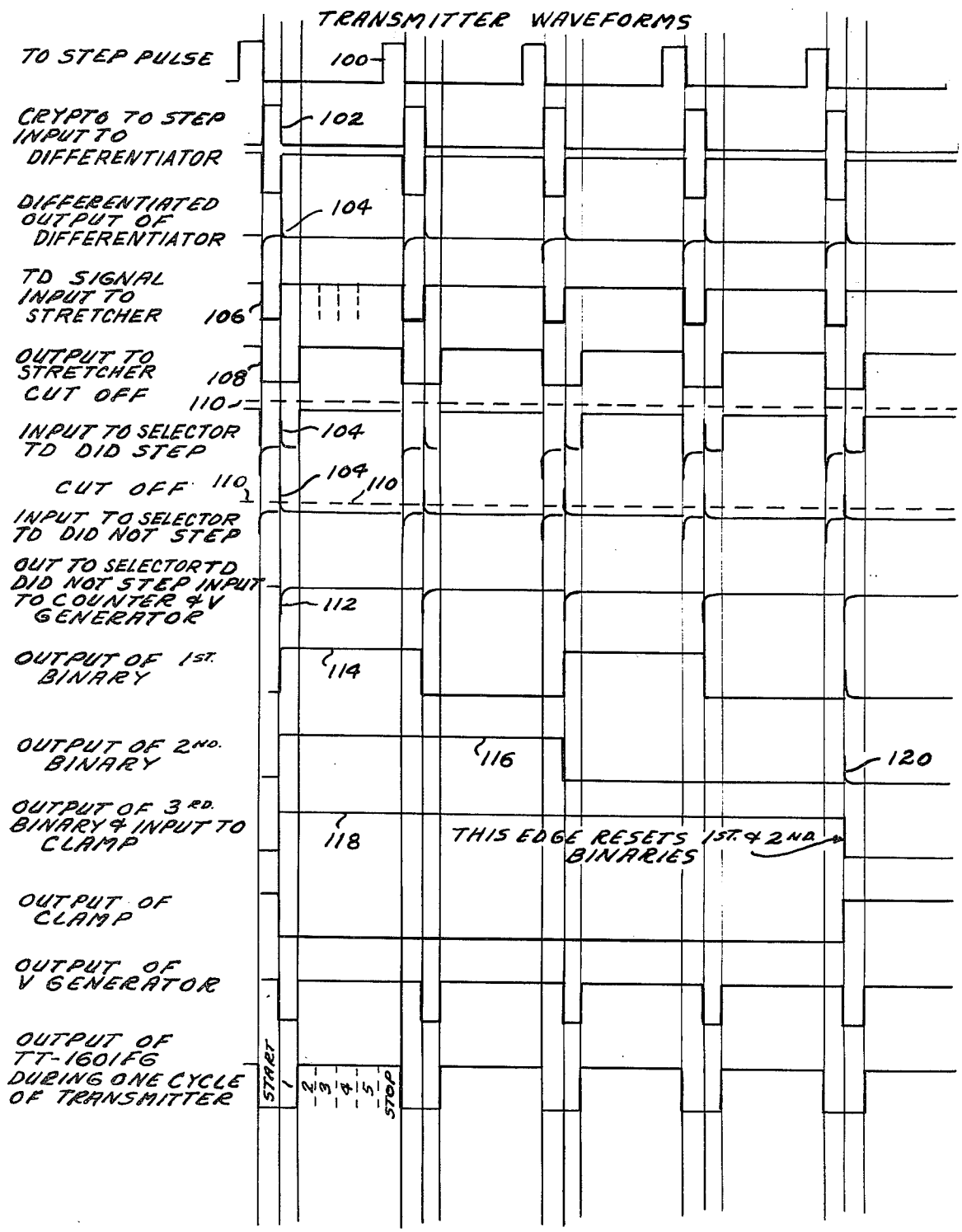

United States Patent [19]

Cory et al.

[11] 4,262,359
[45] Apr. 14, 1981

[54] FIVE V INSERTION UNIT

[75] Inventors: William E. Cory, San Antonio; Allen B. Cunningham, Bellaire, both of Tex.

[73] Assignee: The United States of America as represented by the Secretary of the Air Force, Washington, D.C.

[21] Appl. No.: 827,666

[22] Filed: Jul. 16, 1959

[51] Int. Cl.² ............................................. H04L 9/00
[52] U.S. Cl. ..................................................... 375/2
[58] Field of Search ................. 178/22; 179/1.5, 69 G; 197/4

[56] References Cited

U.S. PATENT DOCUMENTS 2,897,268  7/1959  Bacon ...................................... 178/22
3,042,751  7/1962  Graham ........................... 179/15 AF Primary Examiner—Howard A. Birmiel

EXEMPLARY CLAIM

2. For use with a cryptographic teletype transmission system having a relay for transferring teletype characters to an encyphering transmitter, a decyphering receiver and a teletype printer, a security system comprising a generator for producing an auxiliary teletype character, circuit means responsive to the failure of transfer of a valid teletype character to said transmitter to activate said generator to supply an auxiliary character to said transmitter, a clamp circuit responsive to activation of said generator to inhibit transfer of a valid character to said transmitter until said auxiliary character has been completed, a transfer system for transferring the decyphered characters from the receiver to the printer, storage means for storing a plurality of successive teletype characters, a recognition circuit responsive to the presence of said auxiliary teletype character in said storage means for inhibiting printing of said auxiliary teletype character.

5 Claims, 9 Drawing Figures

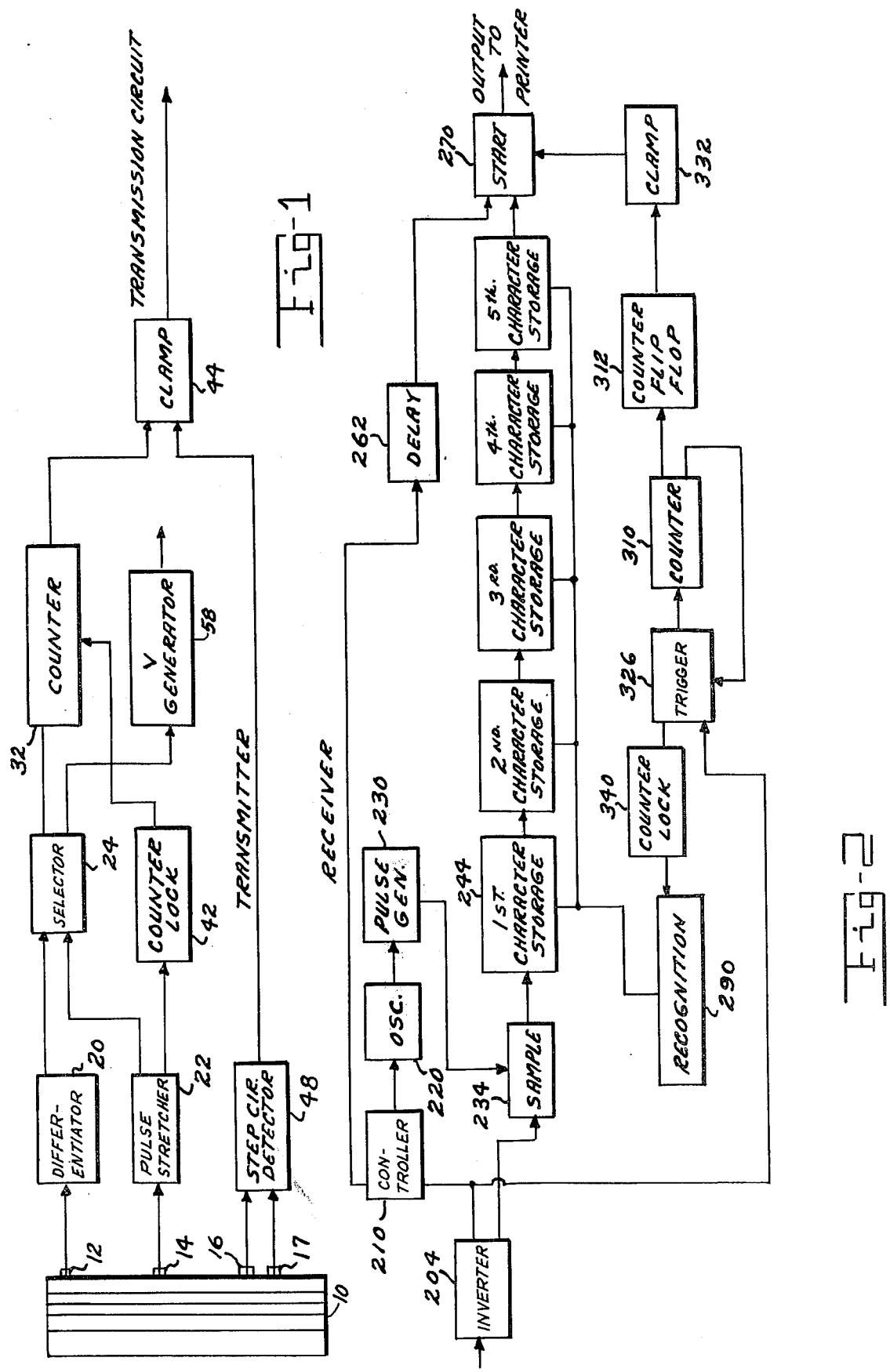

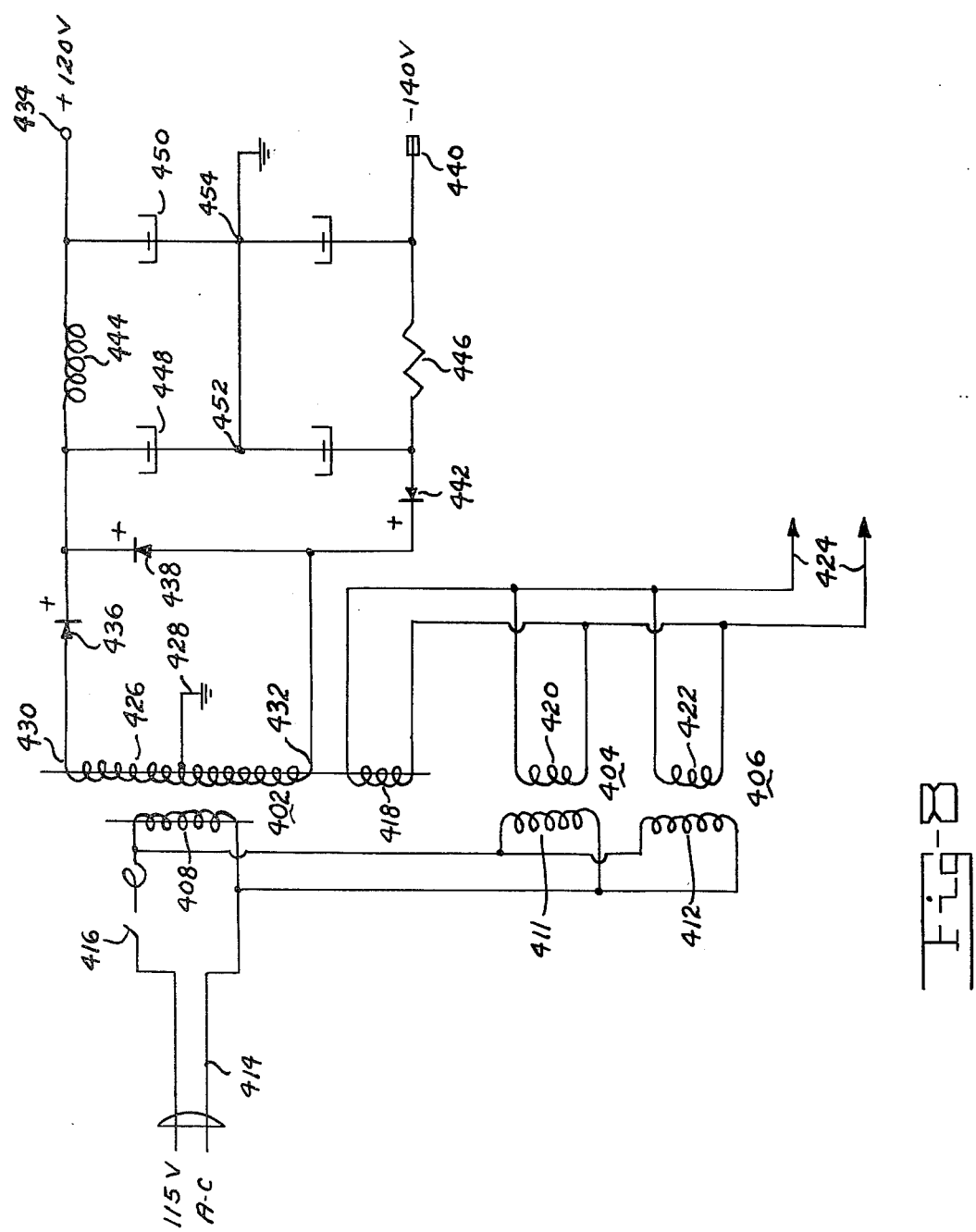

FIVE V INSERTION UNIT

The invention described herein may be manufactured and used by or for the United States Government for governmental purposes without payment to us of any royalty thereon.

This invention relates to a Five V insertion unit and particularly to a security attachment for a synchronous teletypewriter mixer which makes the mixer applicable to automatic switching systems requiring synchronous traffic flow security.

In transmitting teletype messages that may be received by the enemy it has been customary to feed the teletype tape through a transmitter having cryptographic equipment. To secure traffic flow security it is desirable to insert dummy messages in the breaks between the valid messages.

The present invention samples the outgoing messages and automatically inserts dummy traffic between valid traffic and then samples the received traffic to remove the inserted or dummy traffic so that only the valid traffic is printed.

To do this, the transmitter section of the unit generates a thirty-third teletype character, such as, five consecutive V's, which is enciphered and transmitted during nonmessage times. The sequences of the thirty-third character, are detected at the receiving section of the unit, subtracted from the valid text and used to automatically control the printer. Therefore, only valid traffic is printed at the receive terminal, although a constant flow of traffic appears on the transmission system. The system has a further advantage in that it allows full use of all thirty-two standard teletype characters.

It is accordingly an object of the invention to provide improved traffic security.

It is another object to provide means for inserting dummy characters to fill up the valid traffic.

It is a still further object to provide a five V insert in response to absence of valid traffic.

It is still another object to provide continuous traffic with only valid traffic being printed.

It is another object to provide a delay line storage unit for automatically distinguishing between valid and dummy traffic.

Figure 4:
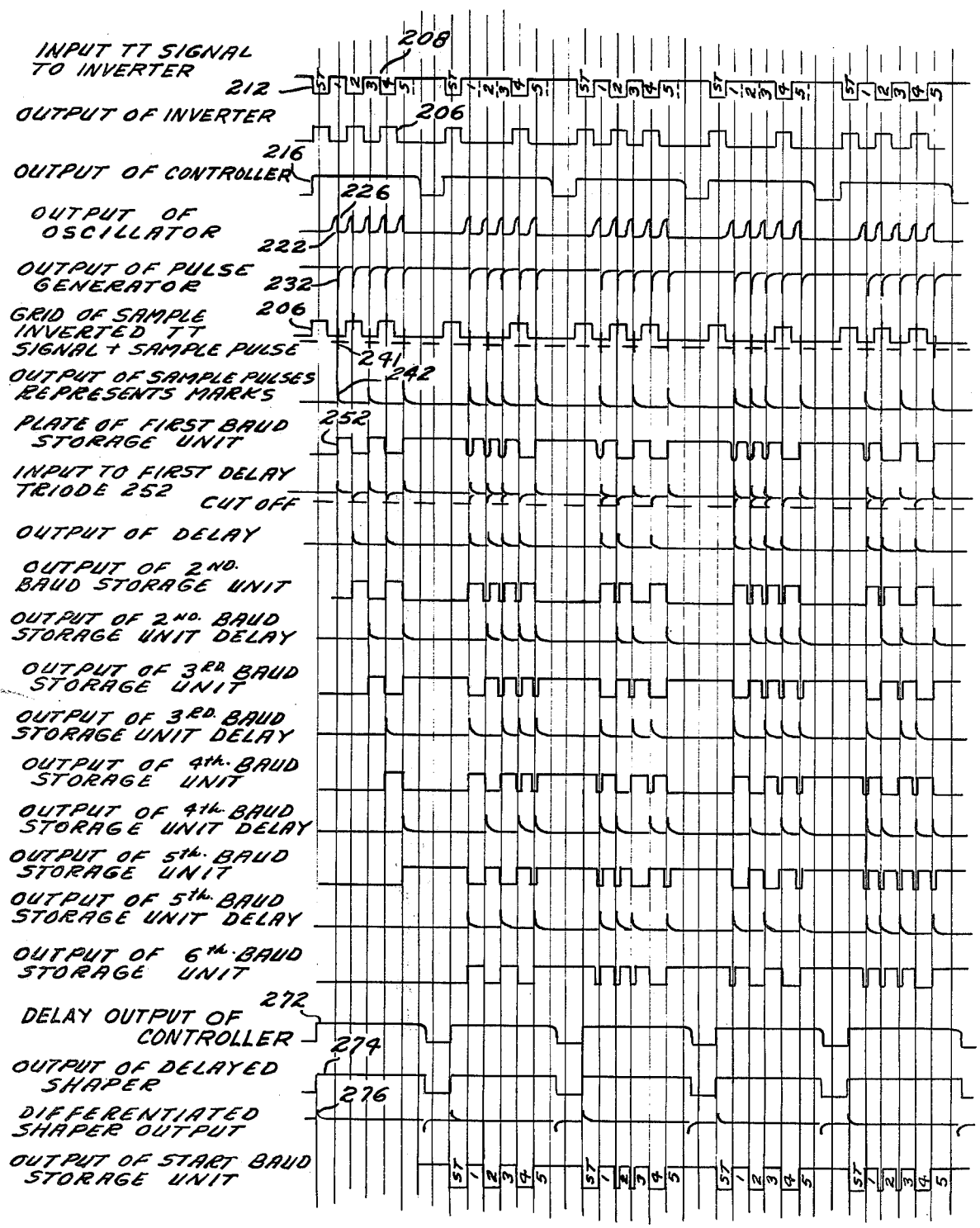
Figure 5:
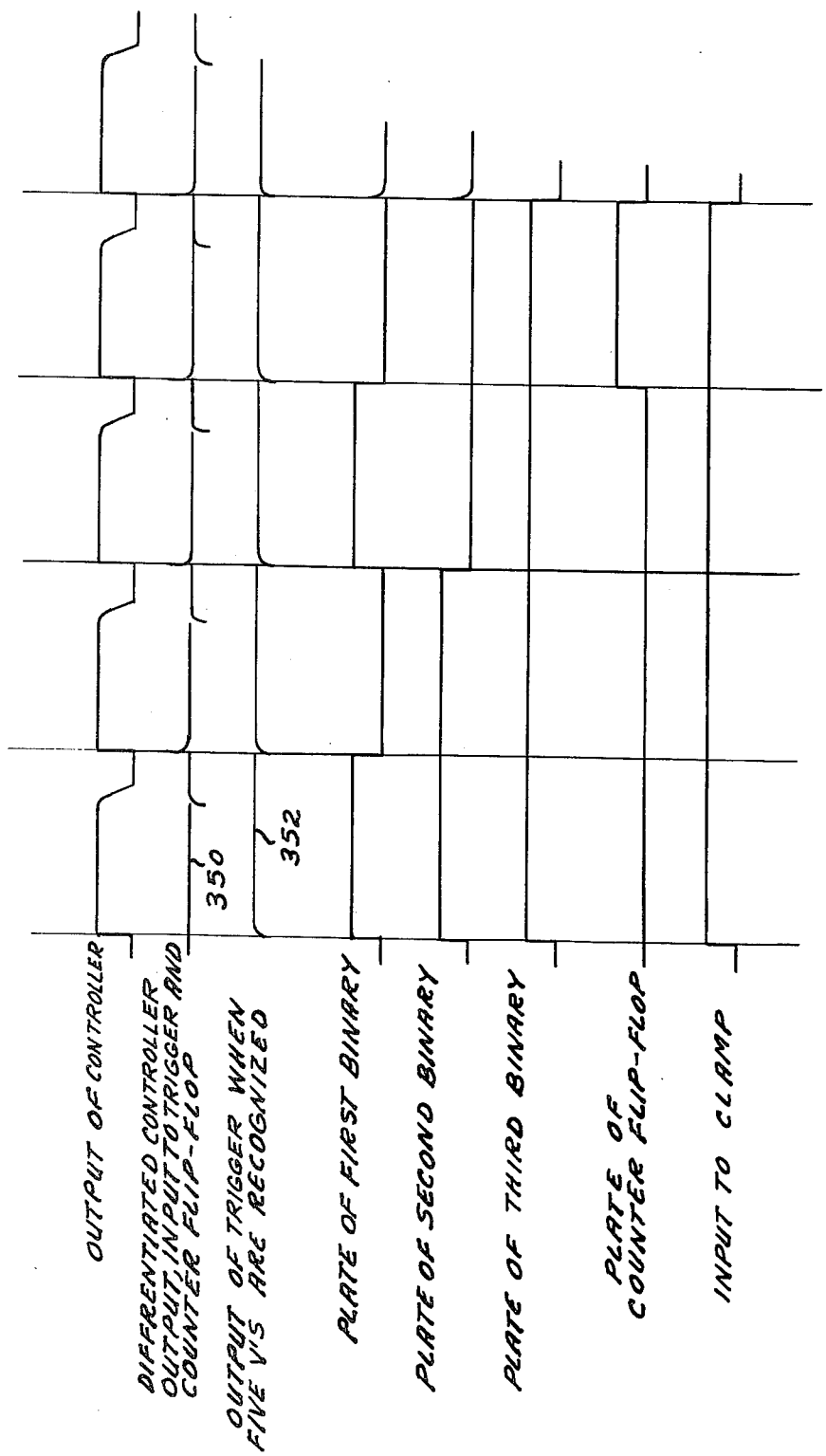
Figure 6:
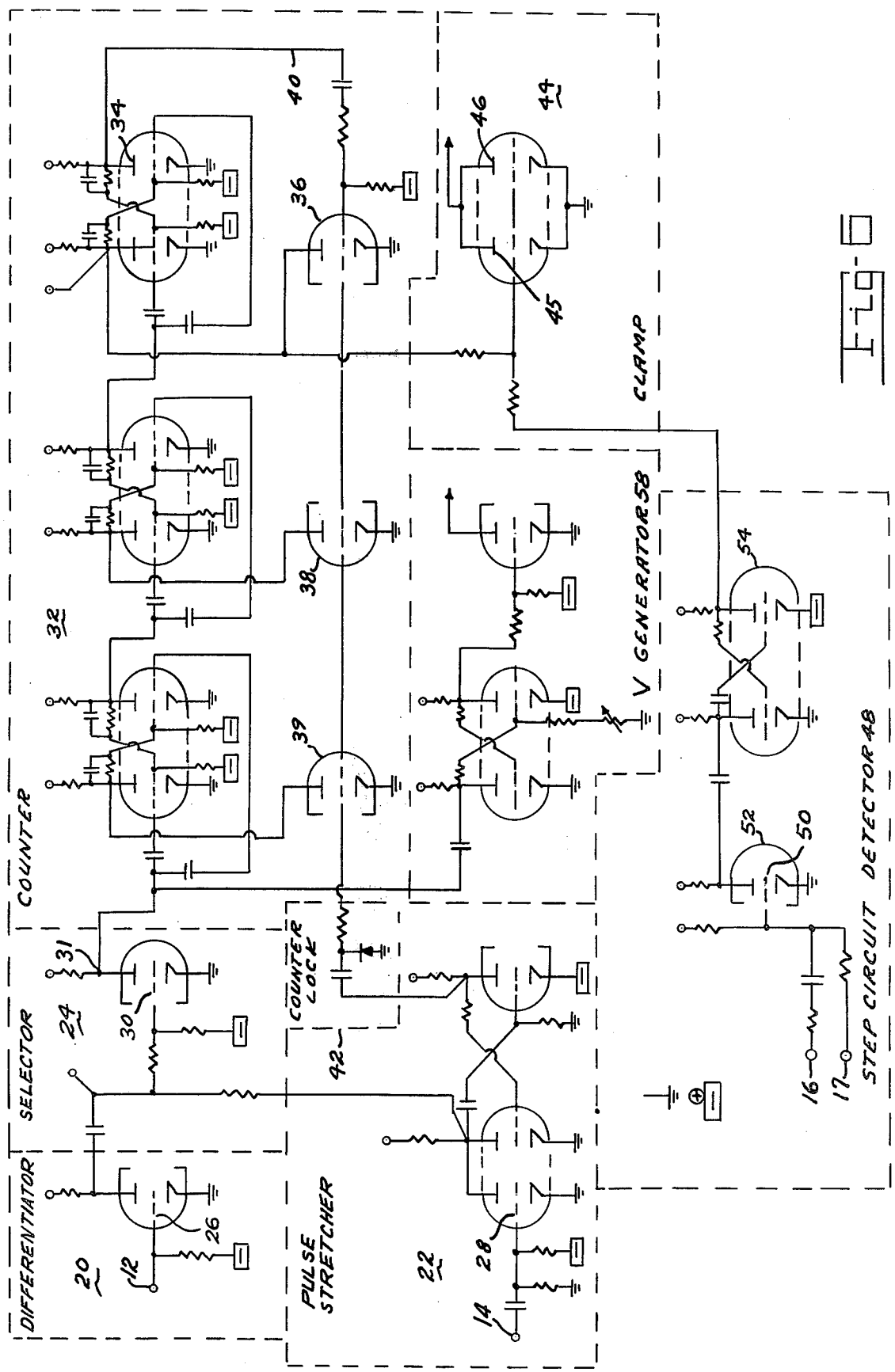
Figure 7:
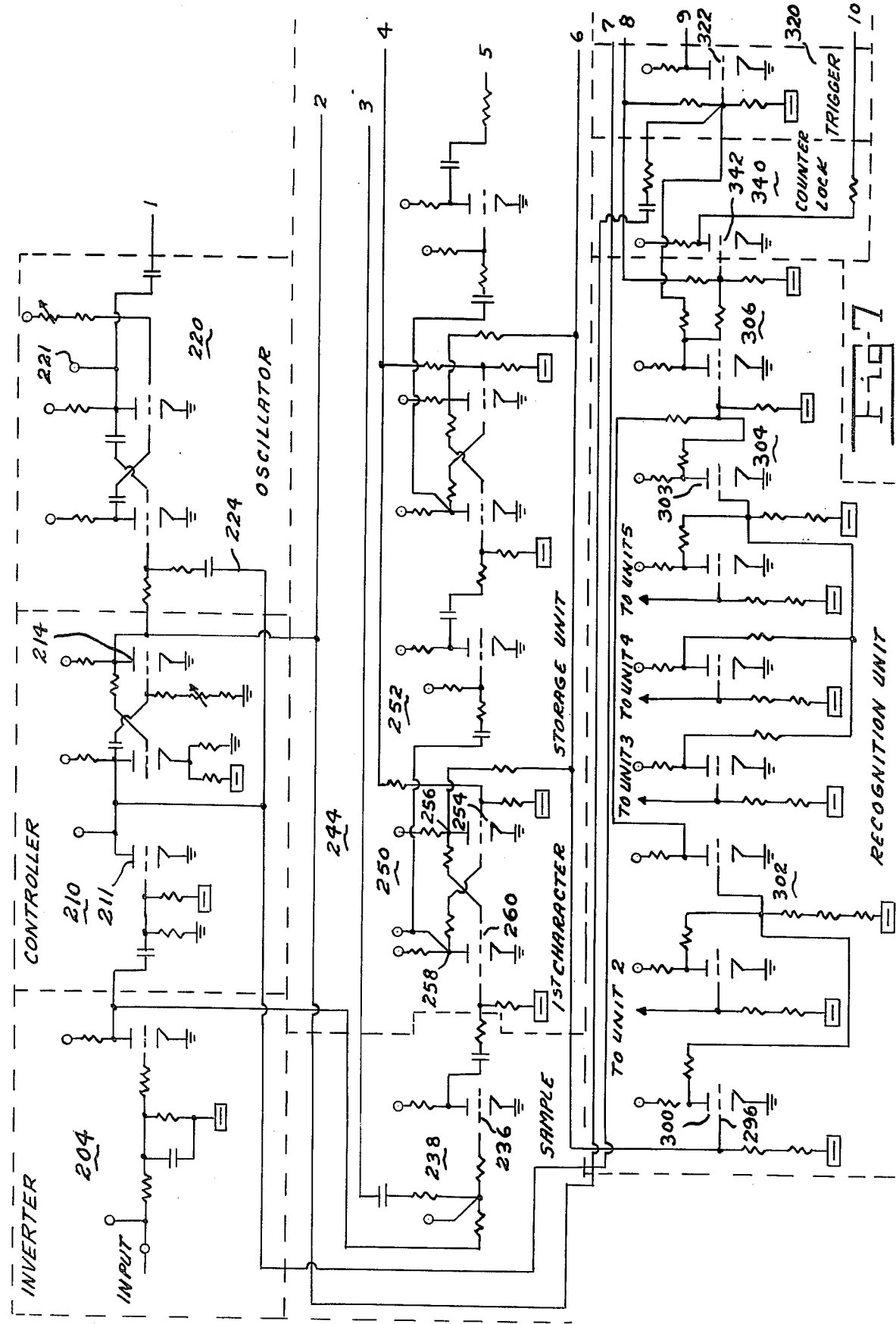
Figure 7A:
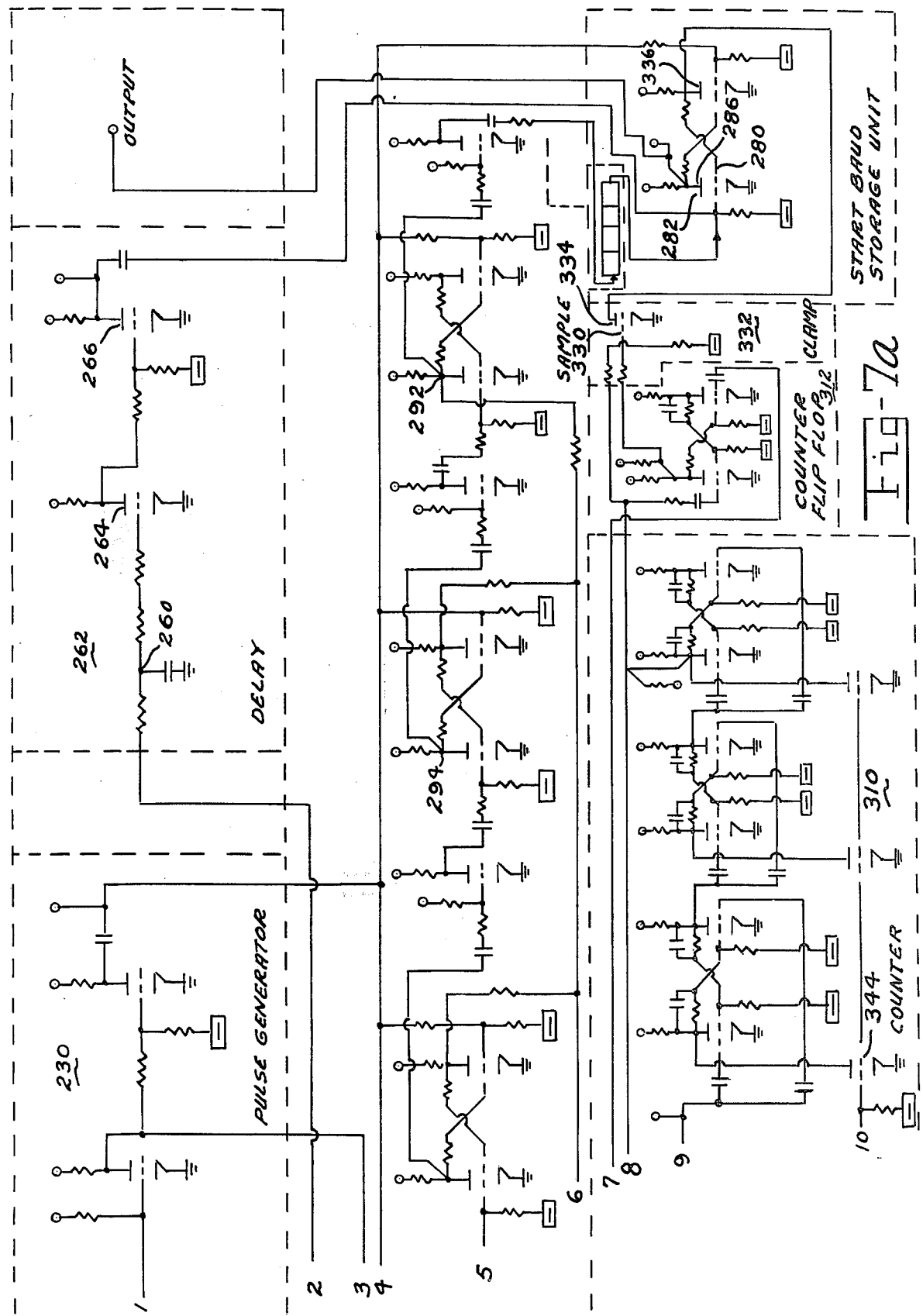

All the objects and advantages will be apparent from the following detailed description taken in conjunction with the accompanying drawing in which:

FIG. 1 is a block diagram of the Five V insertion unit;
FIG. 2 is a block diagram of the Five V removal unit;
FIG. 3 is a diagrammatic showing of the wave forms in the insertion unit;
FIG. 4 is a diagrammatic showing of the wave forms in the removal unit;
FIG. 5 is a diagrammatic showing of the wave forms in the removal counter;
FIG. 6 is a circuit diagram of the insertion unit;
FIGS. 7-7a is a circuit diagram of the removal unit; and
FIG. 8 is a suitable power supply for the units.

In the exemplary embodiment of the invention a synchronous teletypewriter mixer transmitter 10 receives the teletypewriter tape and enciphers the characters from the tape to provide cryptographic traffic flow. The transmitter 10 is provided with a pin or jack 12 connected to the step pulse in the transmitter 10, a pin 14 connected to receive the character start signal in the transmitter 10, pin 16 connected to receive the down going edge of the frequency standard pulse in the transmitter 10 and pin 17 connected in the step pulse relay in such manner as to be below ground when the relay is open and at ground potential when the relay is closed.

The cryptographic traffic is received by a receiver not shown, which reconverts or deciphers the traffic to the original message on the tape and including the inserted V's. The output of the receiver passes through the V removal unit to a printer not shown.

The insertion unit includes a differentiator 20 connected to the jack 12 and a gate 22 connected to jack 14. The step pulse 100 of the transmitter 10 produces pulse 102 at pin 12 to grid 26 of differentiator 20 which produces the differentiated output 104. The character start signal 106 is applied to grid 28 of pulse stretcher 22. Here the start baud is widened out to approximately twice its normal width at 108. Any mark to space transition affects the pulse stretcher 22; however, the stop baud to start baud transition is all that is of interest. The output 108 of pulse stretcher 22 is then a start baud of approximately twice normal width.

The differentiated crypto step pulse 104 from the differentiator 20 and widened start baud 108 from the pulse stretcher 22 are added together on the grid 30 of the selector 24, which is biased to be normally off. If both signals 104 and 108 are present the upgoing spike 104 of the differentiated crypto step pulse rides down in the valley of the widened start baud 108, well below cutoff 110; thus, holding the tube in a steady nonconducting state when the teletype transmitter is transmitting. If the teletype transmitter signal is not present, the spike 104 rides up above cutoff 110, since no start baud is present, and cuts the selector tube on for the duration of the spike 104. Therefore, a sharp down going spike 112 appears every 175 ms at the output 31 of the selector circuit when the teletype transmitter 10 does not step.

Three binary dividers connected in series with feedback loops are used as a counter 32 to produce an output count of five on the last divider. That is, the output plate is nonconducting for four equal periods and conducting for one. The output of the selector circuit 24 is used to trigger the binaries and they require five pulses from the selector 24 to complete one cycle of five counts. Therefore, the counter 32 requires a time equal to the duration of five teletype characters to complete one cycle.

To produce this five count instead of the normal eight, a feedback loop 40 is incorporated which operates in the following manner. When the output of the third binary changes from a high to low state the opposite change is seen on its corresponding plate 34. This change is differentiated to form an upgoing spike 120, which is fed into the grids of three clamp tubes 36, 38 and 39, making up the counter feedback loop 40. This spike 120 turns the clamp tubes 36, 38 and 39 on, which brings the number one plate of each binary to the low or conducting state. This condition is the rest or idle position in which the binaries remain when they are not counting.

If the counter binaries were changed during a noncounting period from their normal idle state by noise pulses, an erroneous count may later appear since they would start counting from something other than the normal rest position. To prevent this, the teletype signal is differentiated and rectified by counter lock 42 to form a series of upgoing spikes which are fed into the counter clamp tubes 36-38-39. These spikes continually clamp the binaries to their idle position. Since the counter operates only when the teletype signal is not present, its count is not affected by spikes derived from the teletype signal in this circuit.

The output of the counter circuit is fed into the clamp circuit 44, which is in turn connected to the teletypewriter step relay. When the output plate of the last binary is conducting or low, the grid 45 of the clamp tube 44 is below cutoff and its plate 46 is then at a high resistance with respect to ground. Conversely, when the output plate of the last binary is high, the clamp tube 44 is caused to conduct and its plate 46 is at a low resistance with respect to ground. Therefore, the clamp circuit 44 merely grounds out the teletype step pulse, when told to do so by the counter circuit 32.

Normally the teletypewriter transmits the artificial character letters when no valid message is being transmitted. To do this the crypto step pulse 100 of the teletypewriter is fed through the crypto step relay and then to the signal relay where it mixes with the TD signal. If TD signal, which is a solid mark when off, is off, the step pulse creates an artificial start baud. Thus, the artificial character letters start, five marks, and stop, is created and sent out of the teletype signal relay when no valid message is being transmitted by the teletype. Now, however, the character V is inserted in place of letters when the teletype is off. This is accomplished by taking the pulses from the selector 24, which appear only when the teletype is off, and widening them out by a pulse stretcher to normal space baud width. Since this space baud is derived from the rear edge of the crypto step pulse, it can be added directly behind the crypto step pulse at the crypto step relay to form start, space, four marks, and stop, or the character V, instead of the normal letters.

In order to turn the TD off, the Step pulse relay circuit is opened preventing the transmitter from receiving a step or start signal. If the step pulse circuit were closed sometime during step pulse time, the transmitter would receive the latter part of the step pulse. This may start the transmitter, but would start it late since the leading edge of the step pulse may be lost. Late starting of the transmitter causes a mismix of key and, therefore, a garbled character. In order to prevent this, the step circuit detector 48 samples the step circuit shortly before step pulse time to see if a completed circuit exists. If no circuit exists, a step pulse is not sent. Information is taken from two points in the teletypewriter to operate this circuit. One point is pin 16; a down going edge from the frequency standard from which the transmitter step pulse is derived. Due to relay transient time this edge occurs approximately seven milliseconds before the step pulse occurs at the output of the step pulse relay. This edge can then be used to sample shortly before step pulse time. Other information is taken from pin 17 which is at ground when the step circuit is closed and below ground when the circuit is open. The sampling edge is a-c coupled to the grid 50 of triode 52 and the relay point d-c coupled to the grid, which is biased well above cutoff. When the step circuit is open the grid bias drops due to change in potential of the relay point and the differentiated edge extends below cutoff and produces an up going spike on the tube plate when the step circuit is open during sample time. This spike is widened out by a pulse stretcher 54 and is applied to the clamp circuit 44 to ground out any part of a step pulse which may appear if any step circuit switch is closed during step pulse time.

The operation of the various transmitter circuits can be summarized as follows: The selector circuit 24 adds the differentiated crypto step pulse from the pulse stretcher 22 to determine whether the transmitter is transmitting or not. If it is, the output of the selector 24 is a steady high condition. If it is not, the output of the selector is a sharp down going spike 112 corresponding in time to the rear edge of crypto step. This spike 112 trips the binary counters 32 and changes the output of the last binary from a low to high state. This change operates the clamp circuit 44 and grounds out transmitter step. Since the transmitter cannot receive a step pulse, it cannot transmit, so the selector puts out a spike each time it fails to see a start baud from the teletype transmitter. These spikes operate the counters and the V generator 58, which causes the teletypewriter to transmit a character V. When the counter receives four more, or a total of five spikes from the selector, its output is changed back to a low state. This releases the clamp and allows a step pulse to be generated. If the condition which caused the transmitter to not step at first has been relieved, the transmitter will begin transmitting again. If not, the insertion unit will repeat its cycle again. It should be noted that the transmitter was held off for a period of time equal to the duration of five teletype characters, after it failed to start at its proper time. During this time five character V's were transmitted by this unit. Therefore, anyone looking at the transmission line would notice no change in traffic volume although the transmitter was off.

The purpose of the removal unit is to monitor all traffic going to the printer, looking specifically for a sequence of five character V's. When five V's are detected the removal unit locks up the receive printer for a period of time equal to the duration of five characters. Thus, groups of five V's, which were sent as dummy traffic by the transmitter, are deleted from the printed copy. Then, only valid traffic is printed, although a constant flow of dummy and valid traffic was received.

In order to monitor all received traffic the remover unit is inserted between the receiver, not shown, and the printer, not shown. Here also, the received signal has been deciphered and can be examined for its true content.

For explanation, the remover unit will be divided into small circuit groups.

The purpose of the inverter circuit 204 is to give the remover unit a squared up, noise free inverted teletype signal 206 from input teletype signal 208.

The controller 210 is activated by the leading edge 212 of the received signal 208 start baud. Its output plate 211 changes from a low to high condition and is held in this condition until sometime during stop time of the received character. Its output 216 is then high during start and character baud times and low during stop baud time.

The oscillator 220 is a multivibrator type oscillator which is controlled by the controller circuit 210. Its frequency is set to give one down going edge 226 per character baud at the oscillator output 221. An RC feed back loop 224 between the oscillator 220 and controller 210 phases the oscillator signal so that the down going edges 226 occur at the center of each character baud of received signal 208.

The pulse generator circuit 230 receives the oscillator output 222 and converts it to a pulse 232 of approximately two milliseconds width in time phase with each down going edge 226 of oscillator signal 222.

The oscillator pulses 232 from the pulse generator 230 and inverted teletype signal 206 from the inverter circuit 204 are combined on the grid 236 of the sample tube 238. The grid 236 is biased so the inverted teletype signals 207 ride above ground holding the tube 238 on, in the low condition. When the sample pulse occurs on an inverted mark, the sample pulse 241 extends down below cutoff giving an up going pulse 242 at the tube output for each mark of teletype signal. During space time the sample pulse 241 does not extend below cutoff, so the tube output remains low during this time. Therefore, the sample circuit output is an upgoing spike 242 in time phase with the center of each mark of character baud.

The character storage of the remover unit consists of five identical character storage units 244. They can be compared to a long tube through which all characters going to the printer must pass. Since this tube will hold five characters, a sequence of five characters may be identified while passing through the tube or storage units.

Since the condition of the character bauds, whether mark or space, is all that is needed to identify a character, only the character bauds were sampled by the sample circuit and passed on to the storage units; thus eliminating circuits for storage of start and stop bauds. Each character storage unit is then made up of five Eccles-Jordan flip-flop circuits 250 for storage of character bauds, and five delay circuits 252 for passing information from one baud storage unit 250 to the next. A flip-flop is applicable for storing a teletype signal, since its plates are either high or low and can be switched from one condition to the other very rapidly.

For explanation of the baud storage flip-flop 250 its two triode sections will be called triode one and triode two. Pulses 226 from the oscillator pulse generator circuit 230 are fed into the grid 254 of triode two, and turn it off making its plate 256 high. This turns triode one on, making its plate 258 low. This action takes place each time the flip-flop 250 receives a pulse 226 from the pulse generator 230 and it receives one pulse 242 from sampler 238 for each character baud. The differentiated pulse 242 which represents a mark from the sample circuit 238 is fed into the grid 260 of triode one. As described earlier this mark pulse was derived from the pulse generator output also. However, transient time of the sample circuit 238 causes the mark pulse to be slightly delayed with respect to the oscillator pulse on grid two. The oscillator pulse turns triode one off, the marking condition, and it remains in this condition for approximately 22 milliseconds until another oscillator pulse is received by triode two. Then triode one is turned on, and if another mark pulse is received triode one is turned back off almost immediately. It is important that the off to on then back to off condition appear between two adjacent marks. This will occur if the mark pulse received by triode one is delayed slightly with respect to the oscillator pulse received by triode two. When a space is received the output of the sample circuit is a constant low condition. Therefore, when triode one is cut on by the oscillator pulse, it remains on in the low or spacing condition since no mark pulse was received from the sample circuit. And it will remain in the spacing condition until it receives another mark pulse. The output of this circuit is taken from the plate 258 of triode one, which is high during marks and low during spaces. When a mark is followed by a space, a down going edge appears on the plate of triode one at the end of the mark duration when the mark changes to a space. If a mark is followed by another mark a down going edge still appears at the end of the baud duration because of the delay of the sample circuit. This down going edge is important because it says that the preceeding baud was a mark. If no down going edge appears the preceeding baud is known to have been a space. The output of triode one is condenser coupled into another triode 252 which is biased to be normally on. The differentiated down going edge from triode one cuts this tube 252 off to form an upgoing spike 262 which says the preceeding baud was a mark. The delay inherent in this tube makes its output very similar to that of the sample circuit. So its output can be fed into triode one of the next baud storage unit, which is identical to the first. In this manner a baud can be passed from storage unit to storage unit. Twenty-five such baud storage units are required to store the character bauds of five characters.

Since the start baud was removed before storage of the signal, it must be replaced before the output of the storage units is sent to the printer. It is then necessary to have a pulse that occurs at the proper time with respect to the output of the storage unit to cause a start baud. Since the sample pulse which fed the storage units sampled the input signal at the center of each character baud, the signal in the storage units will then be displaced one half a baud behind the original signal. Therefore, the original start baud would have to be delayed one half a baud width to be in proper phase to be added to the output of the storage units. To do this the output 216 of the controller 210, which has an up going edge at start time and down going edge at stop time, is delayed by an RC circuit 260 of a delay 262 and fed into a triode 264. The output 272 of this triode 264 is put through a shaper tube 266 to give a wave shape 274 similar to the controller 210, but delayed one half a baud behind the gate signal.

The start baud storage unit 270 operates exactly like the character baud storage units. Its purpose is to insert a start baud in the output of the character baud storage units so that the original teletype signal can be recaptured and sent to the printer. The output of the delay circuit 262 and the output of the twenty-fifth character baud storage unit are fed into triode 272 of this storage unit 278. The output of the delay circuit is differentiated to form an up and down going spike. The up going spike 276 was delayed to where it is at the proper position to be the leading edge of a start baud for the output of the last character baud storage unit. So it is fed into the grid 280 of triode 282 and cuts triode 282 on, the spacing condition. The down going edge is at the proper time to be the leading edge of the stop baud. It then turns triode 282 off, the marking condition. Therefore, the start and stop bauds are put on the start baud storage unit at the proper time, and the character bauds are put on by the last character baud storage unit. Then a teletype signal appears to go in one end of the receiver and come out the other five characters later. The output is taken off plate 286 of this storage unit and sent to the printer.

A recognition circuit 290 is connected to the character storage units. This circuit constantly looks for a sequence of five V's in the character storage units. If a character V were progressing through the storage units and set up on the first character storage unit, a space would be seen at the fifth baud storage unit and a mark on the first four. If the output plate 292 of the fifth was looked at along with the nonoutput plates 294 of the first four, a low condition would be seen on each flip-flop storage unit when the character V is set up on the character storage unit. This condition of five lows would not be seen when any other character was set up on the storage unit because the flip-flops would be set in a different fashion by any other character. These points are all connected to the grid 296 of a triode 300 which is biased on. And only when all points are low, when a character V is in the unit, will the tube 300 be cut off. Five triodes are connected in this manner; one to each character storage unit. The output of two of these triodes is connected to still another triode 302 in such a manner that both triodes have to be off, see a V, before the last will be turned on. The other three are connected to another triode 304 so that all three have to be off, see a V, before 304 will be on. Then these two are connected to a final triode 306 which is biased on, so that both these two have to be on before the final tube 306 will turn off. Therefore, the final triode 306 will be turned off only when a sequence of five V's appear in the storage units. Thus, a sequence of five V's can be recognized.

The removal unit has a five unit counter circuit 310 which is identical to the counter in the insertion unit. In addition another Eccles-Jordan flip-flop 312 is added to the counter circuit 310. As explained before, the output of the five unit counter 310 is low during the idle period, and has a cycle which is high for four 175 ms periods and low for one. The differentiated output 350 of the five unit counter 310 is fed into the flip-flop 312 so that the high to low change of the counter 310 will trip the flip-flop 312. Its output is normally low and is changed to high by this change of the counter 310. Also, a down going edge which corresponds in time to the leading edge of the start baud of received signal is fed into the flip-flop 312 from controller 210 and resets its output to its normal low condition. Thus, the output of the flip-flop 312 is low for four 175 ms periods and high for one; or it appears to be 180 degrees out of phase with the five unit counter output. These two outputs added together then give a total output which is high for a period of time equal to the duration of five teletype characters.

As in the insertion unit the remover has an trigger circuit 320 whose output 352 triggers the counter circuit 310. An up going spike from controller 210 corresponding to the leading edge of the start baud of received signal is coupled to the grid 322 of the trigger 320 along with the outputs of the recognition circuit 290 and five unit counter 310. Normally this tube is biased below cutoff so that its output is a steady high condition. However, when a sequence of five V's appear in the storage units, the output of the recognition circuit 290 changes from low to high and raises the bias on the grid 322 of the trigger 320. This allows the spike to cut the tube on which gives a sharp down going spike at the trigger output to trigger the counter 310. Since the output of the recognition circuit 290 may change when the storage units receive the next baud, the output of the counter 310, which was tripped high by the first pulse from the trigger 320, holds the trigger grid bias high to allow four more spikes to go through the trigger 320. This completes the counter cycle so the grid bias drops down below cutoff and remains there until changed again by the recognition circuit 290. Therefore, the trigger 320 allows five trigger spikes to go to the counter when a sequence of five V's appear in the storage units.

The outputs of the five unit counter 310 and flip-flop 312 in the counter circuit are coupled to the grid 330 of the clamp tube 332 in such a manner that if either output is high, the grid 330 will be at ground. The plate 334 of the clamp tube 332 is connected to the nonoutput plate 336 of the start baud storage unit. Therefore, when a sequence of five V's appear in the storage units, the counters are triggered, which activates the clamp 332 to clamp the nonoutput plate 336 of last storage unit to ground for a period of time equal to the duration of five teletype characters. The output plate 286 is then held high in the marking condition to lock up the printer during this period. Thus the sequence of five V's is eliminated from the printed traffic.

During the idle or noncounting period of the five unit counter 310, the number one plate of each binary is in the low condition. A counter lock circuit 340 is used to hold the counter 310 in the idle position so it will always start counting from the same position. The action of this circuit is very similar to that of the trigger 320. The outputs of the recognition circuit 296 and five unit counters are connected to the grid 342 of triode which is biased to be cut off. Its output is connected to the grids 344 of the counter clamp tubes. When the triode 340 is off, the clamps are on and the binaries are clamped in their idle position. When the recognition circuit 290 acts or the counter 310 is in its cycle, the triode 340 is on and the clamps are off leaving the counters free to operate.

The action of the receive terminal can be summarized in the following manner. Deciphered signal is taken from the teletype receiver and fed into the removal unit. Here the start and stop bauds are removed from the teletype signal and the character bauds are fed into a series of five character storage units, each made of five baud storage units. Here the character bauds of five consecutive characters can be stored. The start and stop bauds are added to the output of the fifth character storage unit to recapture the original teletype signal and this signal is to be sent to the printer. While the signal is passing through the storage units, it is examined for its content. If a sequence of five V's is detected, a steady mark is sent to the printer for a period of time equal to the duration of five teletype characters. This solid mark locks up the printer; therefore, a sequence of five V's is subtracted from the printed traffic.

While any suitable power source can be used with the security attachment, a satisfactory power unit is shown in FIG. 8, in which a plurality of transformer 402, 404 and 406 have their respective primary windings 408, 410 and 412 connected in parallel to an ac circuit 414 through a switch 416. Secondary windings 418, 420 and 422 in the respective transformers are connected in parallel to heater circuit 424 for the heater elements of the several tubes.

The power supply power includes a secondary winding 426 on transformer 402 having an intermediate ground connection 428, the opposite terminals 430 and 432 are connected to positive terminal 434 by rectifiers 436 and 438 respectively to provide a positive potential of 120 volts above ground. The negative terminal 440 is connected to terminal 432 by rectifier 442. A smoothing filter includes a reactor 444 in series between rectifiers 436 and 438 and positive terminals 434, an impedance 446 is connected between terminals 440 and rectifier 442. Sectionalized capacitors 448 and 450 are connected between the terminals 434 and 440 providing intermediate ground terminals 452 and 454 between the sections.

For purpose of illustration a specific embodiment has been shown and described according to the best present understanding thereof; however, it will be apparent to those skilled in the art that various modifications and arrangements can be resorted to without departing from the true spirit and scope of the invention.

We claim:

1. For use with a synchronous teletype transmitter having a relay supplying type characters to an encyphering transmitter, a receiver converting the cryptographic traffic back to type characters and a printing device for reproducing the teletype message, a security attachment for applying groups of V's to the encyphering device in response to absence of a valid message and for removing the groups of V's from the reproduced message comprising a differentiator triggered by the synchronizing pulse of the teletype transmitter to provide an integrated step signal, a start pulse stretcher responsive to the presence of teletype characters being transmitted, a selector responsive to the outputs of said differentiator and said start pulse stretcher, a counter responsive to the output of said selector, a multiple V generator responsive to the output of said selector for applying multiple V's to said transmitter in response to the absence of a teletype character supplied to said transmitter, means responsive to operation of said counter for inhibiting supply of characters to said transmitter during transmission of said multiple V's, an inverter energized by the deciphered output of said receiver, a controller activated by the leading edge of a received character start baud, a pulse generator responsive to activation of said controller, a sampler controlled by the combined outputs of said inverter and said pulse generator, a plurality of serially connected character storage units, a recognition circuit, said recognition circuit being responsive to a V in each character storage unit, a clamp circuit connected to said recognition circuit for controlling the operation of said printer.

2. For use with a cryptographic teletype transmission system having a relay for transferring teletype characters to an encyphering transmitter, a decyphering receiver and a teletype printer, a security system comprising a generator for producing an auxiliary teletype character, circuit means responsive to the failure of transfer of a valid teletype character to said transmitter to activate said generator to supply an auxiliary character to said transmitter, a clamp circuit responsive to activation of said generator to inhibit transfer of a valid character to said transmitter until said auxiliary character has been completed, a transfer system for transferring the decyphered characters from the receiver to the printer, storage means for storing a plurality of successive teletype characters, a recognition circuit responsive to the presence of said auxiliary teletype character in said storage means for inhibiting printing of said auxiliary teletype character.

3. For use with a cryptographic teletype transmission system having a relay for transferring teletype characters to an encyphering transmitter, a decyphering receiver and a teletype printer, a security system comprising; a generator for producing an auxiliary teletype character, circuit means responsive to the failure of transfer of a valid teletype character to said transmitter to activate said generator to supply an auxiliary character to said transmitter, a clamp circuit responsive to activation of said generator to inhibit transfer of a valid character to said transmitter until said auxiliary character has been completed, a transfer system for transferring the decyphered characters from the receiver to the printer, said transfer system including means for providing an inverted teletype signal, a pulse generator providing a pulse at about the center of each character baud of the teletype signal, a sampler responsive to said inverted signal and said pulses, a plurality of character storage units, each of said storage units including a plurality of flip-flop circuits for storage of character bauds, a delay circuit for each flip-flop for passing information from one baud storage unit to the next, a recognition circuit including a circuit connection for each of said storage units, a counter controlled by the output of said recognition circuit and means controlled by said counter circuit for controlling the operation of said printer.

4. For use with a cryptographic teletype transmission system having a transmitter including a teletype character feeding section, a cryptographic transmitter section, a relay for transferring characters from said feeding section to said cryptographic section, a source of synchronizing pulses, a cryptographic receiver for converting the cryptographic transmission to teletype characters and a printer device for reproducing the message, a security system comprising; means responsive to absence of a character to be transferred to said cryptographic section to generate an auxiliary teletype character, connection to apply the auxiliary character to the cryptographic transmitter section, a clamp circuit responsive to the generation of said auxiliary teletype character to inhibit operation of the character transferring relay until completion of the auxiliary character, a character storage system receiving the output of said receiver, a recognition circuit controlled by the presence of said auxiliary teletype character in said character storage system, an inhibiting circuit controlled by said recognition circuit for inhibiting printing of said auxiliary teletype character.

5. For use with a synchronous teletype transmission system having a teletype character unit, an enciphering transmitter and means for transferring teletype characters from the character unit to the enciphering transmitter, a decyphering receiver and a printer, a security system; comprising a differentiator circuit connected to provide a pulse derived from the step pulse of the transmitter, pulse stretcher responsive to the start baud of the teletype character to provide a widened start baud, a selector connected to receive the combined outputs of said differentiator circuit and said pulse stretcher, a counter including a plurality of serially connected binary dividers, said counter being connected to be controlled by the output of said selector, an auxiliary character generator connected to receive the output of said selector, said generator supplying an auxiliary teletype character to said transmitter, a clamp connected to be controlled by the output of said counter, said clamp being operative to inhibit operation of said character transferring means, a receiver, an inverter receiving the deciphered character signal, a controller activated by the leading edge of the character start bauds of the received signal, a pulse generator controlled by said controller, a sample circuit controlled by the combined output of said inverter and said pulse generator, a plurality of series connected character storage units, each of said character storage units including a plurality of flip-flop circuits constituting baud storage units, the initial flip-flop of the first character storage unit being connected to be controlled by the output of said sample circuit, a delay circuit between each of the suceeding flip-flops to transmit character bauds from one baud storage unit to the next, a recognition circuit connected to be controlled by the condition of the respective character storage units, a clamp responsive to a predetermined output of said recognition circuit, said clamp controlling operation of said printer.

* * * * *

UNITED STATES PATENT AND TRADEMARK OFFICE
CERTIFICATE OF CORRECTION

PATENT NO. : 4,262,359

DATED : April 14, 1981

INVENTOR(S) : William E. Cory and Allen B. Cunningham

It is certified that error appears in the above—identified patent and that said Letters Patent is hereby corrected as shown below:

Col. 8, line 54, change "power" second occurrence to -- proper--. Col. 8, line 63, change "terminals" to -- terminal --. Col. 10, line 22, change "connection" to -- connections --.

Signed and Sealed this

First Day of September 1981

[SEAL]

Attest:

Attesting Officer

GERALD J. MOSSINGHOFF

Commissioner of Patents and Trademarks